US008040937B2

(12) United States Patent
Michaels

(10) Patent No.: US 8,040,937 B2
(45) Date of Patent: Oct. 18, 2011

(54) SELECTIVE NOISE CANCELLATION OF A SPREAD SPECTRUM SIGNAL

(75) Inventor: Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 737 days.

(21) Appl. No.: 12/056,024

(22) Filed: Mar. 26, 2008

(65) Prior Publication Data
US 2009/0245327 A1 Oct. 1, 2009

(51) Int. Cl.
*H04B 1/00* (2006.01)
(52) U.S. Cl. ......... 375/148; 375/130; 375/147; 375/140
(58) Field of Classification Search .................. 375/148, 375/130, 147, 140
See application file for complete search history.

(56) References Cited

U.S. PATENT DOCUMENTS

| | | |
|---|---|---|
| 3,564,223 A | 2/1971 | Harris et al. |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A * | 5/1995 | Sutton et al. .................. 375/133 |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A * | 12/1998 | Langberg et al. ............. 375/219 |
| 5,900,835 A | 5/1999 | Stein |
| 5,924,980 A | 7/1999 | Coetzee |

(Continued)

FOREIGN PATENT DOCUMENTS
EP 0 849 664 A2 6/1998
(Continued)

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium On, IEEE, PI, Sep. 1, 2006, pp. 1-5, XP031023581, ISBN: 978-1-4244-0329-5.

(Continued)

*Primary Examiner* — Kenneth Lam
(74) *Attorney, Agent, or Firm* — Fox Rothschild, LLP; Robert J. Sacco

(57) ABSTRACT

A method is provided for improving a signal-to-noise ratio in a received signal. The method involves receiving a spread spectrum signal (SSS) with a power level below a noise floor of a receiver. The SSS is generated by modulating a data signal using a spreading sequence (SS) comprised of a random number sequence (RNS). The SS can be generated using a chaos generator or any other deterministic means. The method also involves comparing a magnitude of each number of the RNS which was used to generate the SSS to an adaptable threshold value. The adaptable threshold value is selected based on a minimum magnitude of each number necessary to produce samples having a predetermined signal-to-noise ratio. Notably, samples of the received SSS are excluded from a receiver processing based on a result of the comparison. Similarly, each number of a random number sequence is excluded from the receiver processing based on the comparison.

24 Claims, 10 Drawing Sheets

U.S. PATENT DOCUMENTS

| | | | |
|---|---|---|---|
| 5,937,000 A | 8/1999 | Lee et al. | |
| 6,014,446 A | 1/2000 | Finkelstein | |
| 6,023,612 A | 2/2000 | Harris et al. | |
| 6,038,317 A | 3/2000 | Magliveras et al. | |
| 6,078,611 A * | 6/2000 | La Rosa et al. | 375/147 |
| 6,304,216 B1 | 10/2001 | Gronemeyer | |
| 6,304,556 B1 | 10/2001 | Haas | |
| 6,331,974 B1 | 12/2001 | Yang et al. | |
| 6,377,782 B1 | 4/2002 | Bishop et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,980,656 B1 | 12/2005 | Hinton, Sr. et al. | |
| 6,986,054 B2 | 1/2006 | Kaminaga et al. | |
| 6,993,016 B1 | 1/2006 | Liva et al. | |
| 7,023,323 B1 | 4/2006 | Nysen | |
| 7,027,598 B1 | 4/2006 | Stojancic et al. | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 * | 8/2006 | Okubo et al. | 375/130 |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,529,292 B2 | 5/2009 | Bultan et al. | |
| 7,643,537 B1 * | 1/2010 | Giallorenzi et al. | 375/142 |
| 7,779,060 B2 * | 8/2010 | Kocarev et al. | 708/250 |
| 7,830,214 B2 | 11/2010 | Han et al. | |
| 7,853,014 B2 | 12/2010 | Blakley et al. | |
| 7,974,146 B2 | 7/2011 | Barkley | |
| 2002/0099746 A1 | 7/2002 | Tie et al. | |
| 2003/0044004 A1 | 3/2003 | Blakley et al. | |
| 2004/0001556 A1 * | 1/2004 | Harrison et al. | 375/267 |
| 2004/0059767 A1 | 3/2004 | Liardet | |
| 2004/0196212 A1 | 10/2004 | Shimizu | |
| 2005/0031120 A1 | 2/2005 | Samid | |
| 2005/0050121 A1 | 3/2005 | Klein et al. | |
| 2005/0089169 A1 | 4/2005 | Kim et al. | |
| 2005/0207574 A1 | 9/2005 | Pitz et al. | |
| 2005/0274807 A1 | 12/2005 | Barrus et al. | |
| 2006/0072754 A1 | 4/2006 | Hinton et al. | |
| 2006/0123325 A1 | 6/2006 | Wilson et al. | |
| 2006/0209932 A1 * | 9/2006 | Khandekar et al. | 375/148 |
| 2006/0251250 A1 | 11/2006 | Ruggiero et al. | |
| 2007/0121945 A1 | 5/2007 | Han et al. | |
| 2007/0230701 A1 | 10/2007 | Park et al. | |
| 2008/0008320 A1 | 1/2008 | Hinton et al. | |
| 2008/0016431 A1 | 1/2008 | Lablans | |
| 2008/0095215 A1 * | 4/2008 | McDermott et al. | 375/146 |
| 2008/0198832 A1 | 8/2008 | Chester | |
| 2008/0263119 A1 | 10/2008 | Chester et al. | |
| 2008/0294710 A1 | 11/2008 | Michaels | |
| 2008/0294956 A1 | 11/2008 | Chester et al. | |
| 2008/0304553 A1 * | 12/2008 | Zhao et al. | 375/148 |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0034727 A1 | 2/2009 | Chester et al. | |
| 2009/0044080 A1 | 2/2009 | Michaels et al. | |
| 2009/0110197 A1 | 4/2009 | Michaels | |
| 2009/0122926 A1 * | 5/2009 | Azenkot et al. | 375/343 |
| 2009/0196420 A1 | 8/2009 | Chester et al. | |
| 2009/0202067 A1 | 8/2009 | Michaels et al. | |
| 2009/0279688 A1 | 11/2009 | Michaels et al. | |
| 2009/0279690 A1 | 11/2009 | Michaels et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 * | 12/2009 | Wang et al. | 375/130 |
| 2009/0327387 A1 | 12/2009 | Michaels et al. | |
| 2010/0111296 A1 | 5/2010 | Brown et al. | |
| 2010/0254430 A1 | 10/2010 | Lee et al. | |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Manikandan, et al, "A Novel Pulse Based Ultrawide Band System Using Chaotic Spreading Sequences" Communication Systems Software and Middleware, 2007. Comsware 2007. 2nd International Conference On, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Kolumban, et al., "Chaotic Communications with Correlator Receivers: Theory and Performance Limits" Proceedings of the IEEE, vol. 90, No. 5, May 2002.

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings Of The Twenty-First Cairo, Egypt Mar. 16-18, 2004, Piscataway, NJ, USA, IEEE, Mar. 16, 2004, pp. 1-1__1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld-AWolfram Web Resource [online] [retrieved on Nov. 8, 2010] Retrieved from the Internet: <http://mathworld.wolfram.com/surjection.html>.

Weisstein, E., Surejection:, From MathWorld-AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Michaels, et al., U.S. Appl. No. 12/117,086, filed May 8, 2008, Entitled "Cryptographic System Including A Mixed Radix Number Generator With Chosen Statistical Artifacts".

Chester, at al., U.S. Appl. No. 12/116,104, filed May 6, 2008, Entitled, "A Closed Galois Field Cryptographic System".

Chester, at al., U.S. Appl. No. 12/131,386, filed Jun. 2, 2008, Entitled "Adaptive Correlation".

Chester, at al., U.S. Appl. No. 12/137,593, filed Jun. 12, 2008, entitled "Featureless Coherent Chaotic Amplitude Modulation".

Michaels, at al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "SINE/COSINE Generator".

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Micheals, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier AD-HOC Network Communications".

Taylor, F.J., "Residue Arithmetic A Tutorial with Examples", Computer, vol. 17, No. 5, pp. 50-62, May 1984, doi: 10.1109/MC. 1984. 1659138.

Barile, Margherita, "Bijective," From MathWorld-A Wolfram Web Resource, created by Eric W. Weisstein. http://mathworld.wolfram. com/Bijective.html, May 25, 2002.

Weisstein, Eric W., "Injection," From MathWorld-A Wolfram Web Resource. http://mathworld.wolfram.com/Injection.html, Nov. 8, 2008.

Weisstein, Eric W. "Surjection," From MathWorld-A Wolfram Web Resource, http://mathworld.wolfram.com/Surjection.html, Nov. 8, 2008.

Yen, et al., (1999) "Residual Number System Assisted CDMA: A New System Concept", In: ACTS'99, Jun. 8-11, 1999, Sorrento, Italy.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Morsche et al., "Signals and Systems," lecture notes, University of Eindhoven, The Netherlands (1999).

Pourbigharaz F. et al, Modulo-Free Architecture for Binary to Residue Transformation with Respect to ($2m-1$, $2m$, $2m+1$) Moduli Set, IEEE International Symposium on Circuits and Systems, May 30-Jun. 2, 1994, pp. 317-320, vol. 2, London, UK.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 026201-1-026201-5, XP002499416, ISSN: 1063-651X. Retrieved from the Internet: URL:http://prola.aps.org/pdf/PRE/v69/i2/e026201 [retrieved Oct. 13, 2008].

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Barda, A; et al., "Chaotic signals for multiple access communications," Electrical and Electronics Engineers in Israel, 1995, Eighteenth Convention of, vol., No., pp. 2.1.3/1-2.1/3/5, Mar 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec 1984.

Information about Related Patents and Patent Applications, see section 6 of the accompanying Information Disclosure Statement Letter, which concerns Related Patents and Patent Applications.

\* cited by examiner

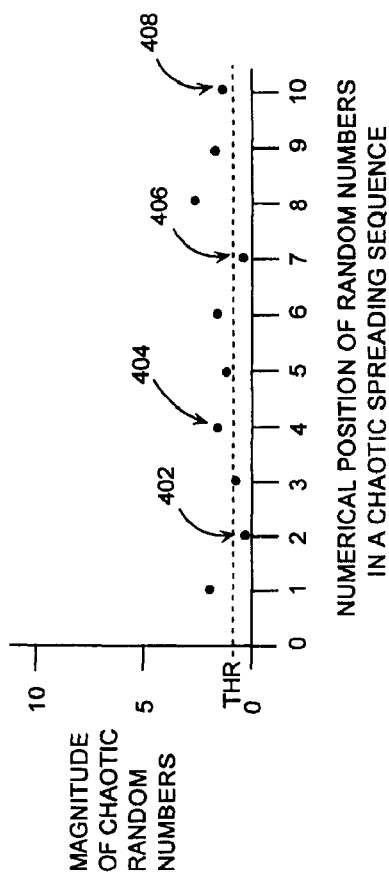
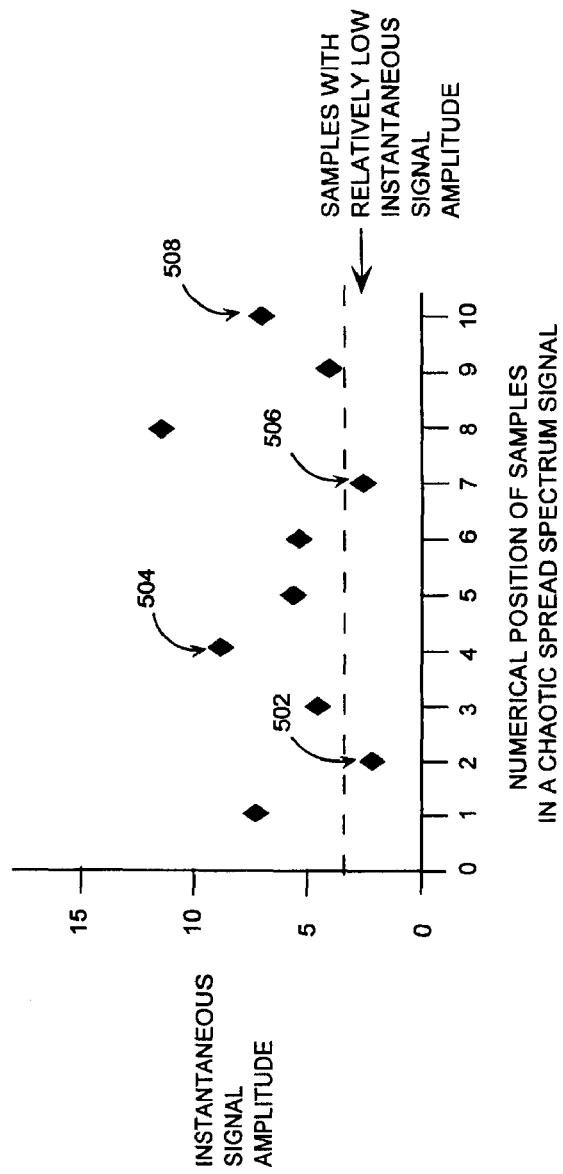

US 8,040,937 B2

SELECTIVE NOISE CANCELLATION OF A SPREAD SPECTRUM SIGNAL

BACKGROUND OF THE INVENTION

1. Statement of the Technical Field

The invention concerns communications systems. More particularly, the invention concerns a communications system receiver configured to (a) improve the effective signal-to-noise ratio (SNR) of a spread spectrum signal and (b) recover input data from the spread spectrum signal.

2. Description of the Related Art

There are many types of communications systems known in the art, such as multiple access communications systems, low probability of intercept/low probability of detection (LPI/LPD) communications systems and spread spectrum communications systems. Many of these systems depend on square wave symbol and/or spreading sequences. Other systems induce exploitable correlations via square-wave pulse shaping. Non-square wave spreading sequences (including chaotic spreading sequences) have also been employed but require significantly more computational power to synchronize. Communication signals employing non-square wave spreading sequences are typically more secure and robust to interferers. As described herein, a chaotic spreading sequence consists of a sequence of numbers having values that appear to have unpredictable transitions characteristics following that of a mathematically chaotic evolution and near ideal statistical properties, yet follow a well-defined deterministic evolution.

Such communications systems can also be configured to operate such that a communications signal has a spread power level below the noise floor of the environment as measured at the communication system receiver. The term "noise floor" as used herein refers to the level of noise which exists in a signal, measured at the input of a communication system receiver.

A multiple access communications system can handle a greater number of users as compared to conventional communications systems, whereby users typically simultaneously re-use a shared communications bandwidth. Each additional signal (optimally orthogonal) may be treated as additive noise. Also, an LPI/LPD communications system can generate signals having less detectable features (or lower measurable power levels) as compared to conventional communications systems since the ambient noise power masks the signal. The signals generated by such communications systems can operate at relatively low signal-to-noise ratios (SNRs), which forces reconstruction and data decision to rely on stochastic signal processing. Any method or device that improves this low SNR will improve the data estimation capability of the communications system, permitting some combination of increased throughput, reduced transmit power, or lower probability of detection/exploitation.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A method is provided for improving the effective signal-to-noise ratio in a received signal. The method generally involves receiving a spread spectrum signal (SSS) with a spread power level below a noise floor of a communications system receiver. The SSS is generated by modulating a data signal using a spreading sequence (SS) comprised of a random number sequence (RNS). The SS can be generated using a digitized chaos generator. The method also involves comparing a magnitude of each number of the RNS which was used to generate the SSS to an adaptable threshold value. The adaptable threshold value is selected based on a minimum magnitude of each number necessary to produce samples having a predetermined signal-to-noise ratio. Notably, samples of the received SSS are excluded from a receiver processing based on a result of the comparison. Similarly, each number of a random number sequence is excluded from the receiver processing based on the result of the comparison.

The receiver processing can include a correlation process or a de-spreading process. As such, the random number of the RNS and the respective sample of the SSS can be communicated to a correlator or a de-spreader if the random number exceeds the adaptable threshold value. At the correlator, the SSS can be correlated with the RNS. This correlation is performed absent of the samples and the numbers excluded as a result of the comparison. At the de-spreader, the data signal can be extracted from the SSS using a de-spreading sequence derived from the RNS. The de-spreading sequence can be generated at the communications system receiver using a digitized chaos generator.

A receiver of a communications system is also provided. The receiver is comprised of RF hardware and a selective cancellation device (SNCD). The RF hardware is configured to receive an analog waveform containing the SSS and background noise. The SNCD is configured to compare a magnitude of each number of the internally generated and synchronized coherent replica of the SSS to the adaptable threshold value. The SNCD is also configured to selectively exclude samples of the SSS from the receiver processing based on the result of the comparison. The SNCD is also configured to exclude each number of the random number sequence from the receiver processing based on the comparison. The SNCD is further configured to communicate each random number of the RNS and respective sample of the SSS to a correlator or de-spreader if the random number exceeds the adaptable threshold value.

BRIEF DESCRIPTION OF THE DRAWINGS

Embodiments will be described with reference to the following drawing figures, in which like numbers represent like items throughout the figures, and in which:

FIG. 4 is a graph illustrating the magnitudes of one potential random number sequence used in a spreading (or combination) process performed by the transmitter of FIG. 1.

FIG. 5 is a graph illustrating one potential sample sequence resulting from a spreading process performed by the transmitter of FIG. 1.

DETAILED DESCRIPTION

Figure 1:
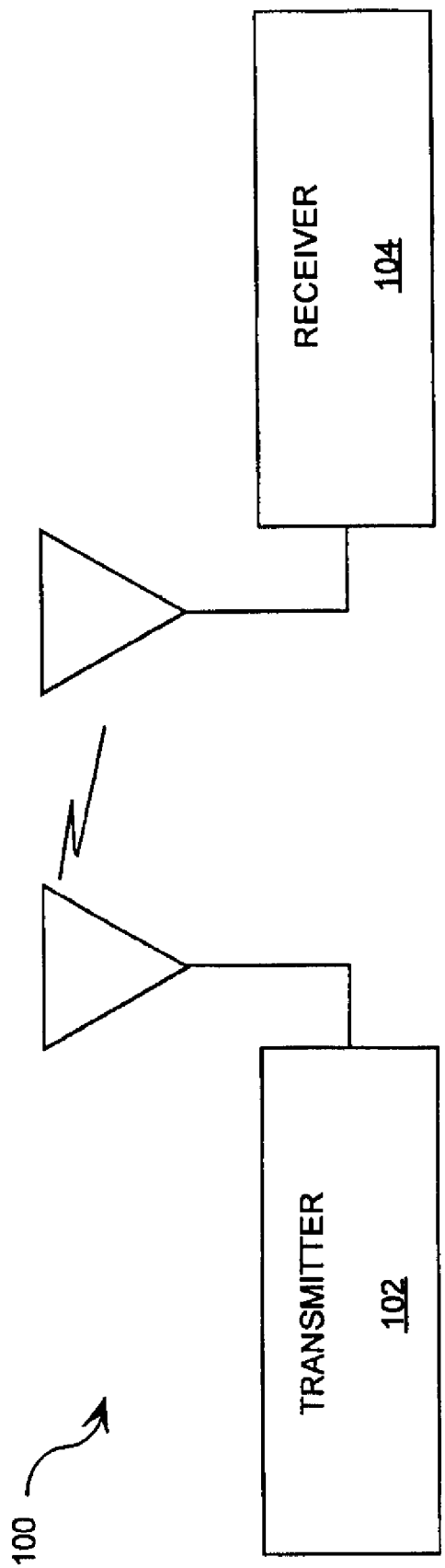
FIG. 1 is a block diagram of a coherent chaotic spread-spectrum communication system that is useful for understanding the invention.

The invention generally concerns a method for improving the SNR of coherent spread spectrum signals. It is well known that the spread spectrum signal is generated by combining information bits of a data signal with random numbers of a spreading sequence, where the rate of the data sequence is much lower than the rate of the spreading sequence. At the receiving end, a corresponding de-spreading sequence that is synchronized with the spreading sequence is used to recover the information bits contained in the data signal. Samples of the received signal are obtained at a rate corresponding to the rate of the spreading sequence and the signal is then de-spread mathematically using a correlation process. The method is most advantageous when the spreading sequence does not primarily have a constant power envelope. The term "spreading sequence" as used herein includes, but is not limited to, chaotic and pseudo-chaotic spreading sequences with known Gaussian distributions. The phrase "Gaussian distribution" as used herein refers to a well-known symmetrical statistical distribution having a precise mathematical formula. A priori knowledge of the spreading sequence used in the transmitted spread spectrum signal permits coherent recombination of the data signal, increasing the effective SNR the spread spectrum signal. A priori knowledge of the spreading sequence also allows selective reconstruction of the data signal by discounting samples with a disproportionately low SNR. By discounting samples with a disproportionately low SNR, the effective SNR is further improved.

The method of selective signal recombination may be used in both a correlator for signal acquisition or in a de-spreader for synchronized de-spreading of a data signal. The method is hereinafter described in relation to a digital chaotic communications system implementation. Still, the invention is not limited in this regard. The invention can also be used with analog chaotic communications systems or other spread spectrum communication systems in which the spreading sequence is comprised of a sequence of pseudorandom numbers. The inventive method can be implemented in any communications system having a built-in redundancy. Such communications systems include, but are not limited to, spread-spectrum communications and communications systems configured to generate signals using a forward error correction technique.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Communications System

Referring now to FIG. 1, there is provided a coherent chaotic spread-spectrum communication system (CCSCS) 100 that is useful for understanding the present invention. The coherent chaotic spread-spectrum communication system 100 is comprised of a transmitter 102 and a receiver 104. The coherent chaotic spread-spectrum communication system 100 typically operates such that a transmitted signal has a spread power level below the receiver 104 noise floor. As stated above, the term "noise floor" as used herein refers to the level of noise which exists in a signal, measured at the input of a receiver.

The transmitter 102 is configured to generate a data signal and to spread the data signal over a wide intermediate frequency band. This spreading consists of multiplying each sample of the data signal by a respective random number sequence of an internally generated chaotic sequence to generate a digitally modulated chaotic signal. If the magnitude of a random number falls below a certain value (e.g., 0.5), then the resulting digital chaotic signal sample may have a relatively low instantaneous signal amplitude. As such, the resulting digital chaotic signal often includes one or more samples with low instantaneous signal amplitudes. In effect, the digital chaotic signal instantaneously has a lower than desired signal-to-noise ratio (SNR) at these samples. The transmitter 102 is also configured to process the digital chaotic signal to place the same in a proper form suitable for transmission over a communications link. The transmitter 102 is further configured to communicate processed chaotic signals to the receiver 104 via a communications link. The transmitter 102 will be described in greater detail below in relation to FIG. 2.

The receiver 104 is configured to receive transmitted chaotic signals from the transmitter 102. The receiver 104 is also configured to improve the SNR of the transmitted chaotic signals by selectively eliminating (or discarding) samples with low instantaneous signal amplitudes. The process for selectively eliminating (or discarding) samples will be described below in relation to FIG. 7.

The receiver 104 is further configured to down convert, digitize, and de-spread a transmitted analog chaotic signal by correlating it with a replica of the chaotic sequence generated at the transmitter 102. The chaotic sequence is also time synchronized to the transmitted analog chaotic signal (i.e., a sampling rate of the chaotic sequence is the same as a sampling rate of the transmitted analog chaotic signal and is synchronized with a clock (not shown) of the transmitter 102). The output of the arithmetic operation that de-spreads the received signal is hereinafter referred to as a de-spread signal. In this regard, it should be understood that the receiver 104 is further configured to process a de-spread signal for obtaining data contained therein. The receiver 104 is configured to convert the data into text, sound, pictures, navigational-position information, and/or any other type of useful payload information that can be communicated. The receiver 104 is described in greater detail below in relation to FIG. 3.

Figure 2:
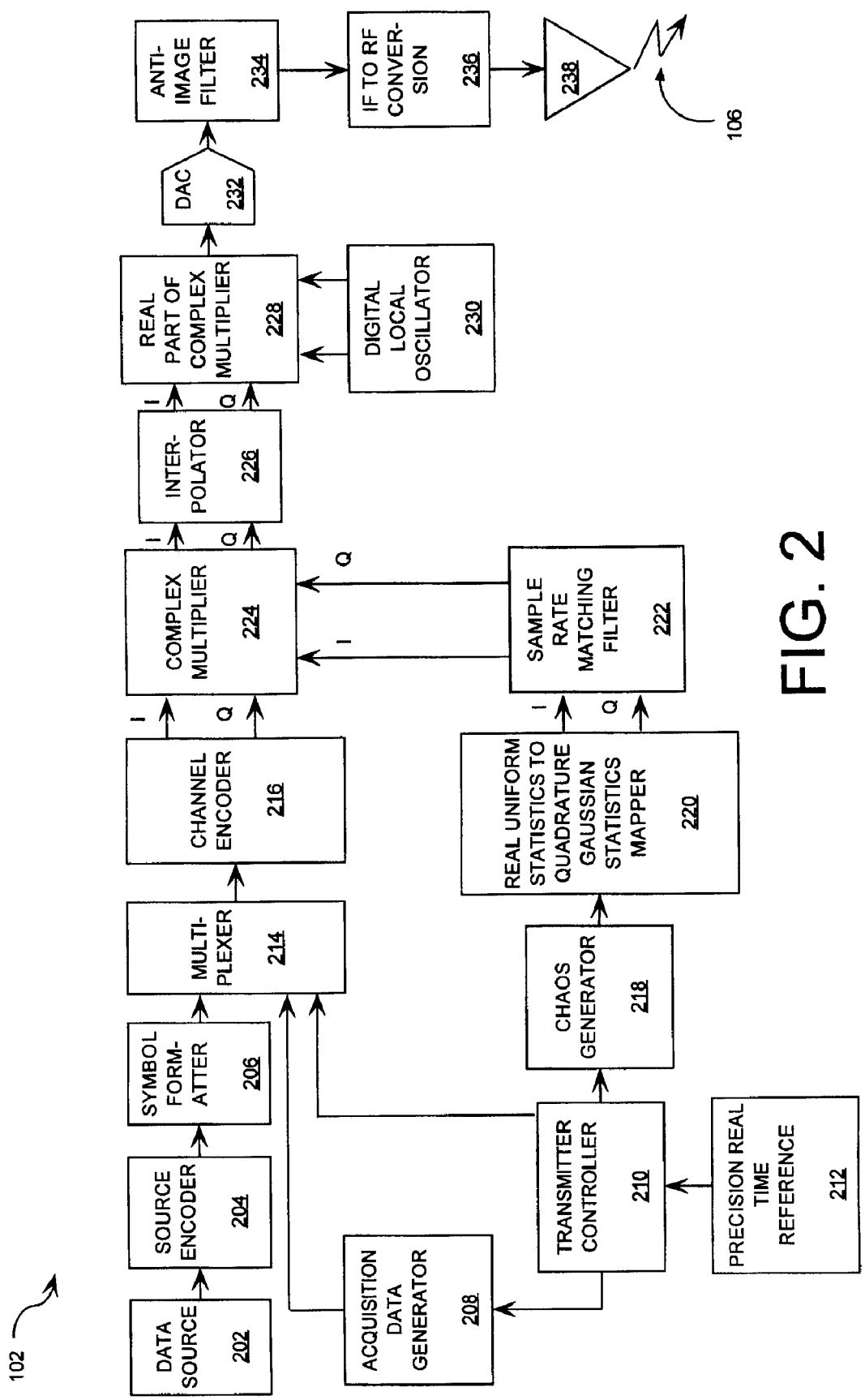
FIG. 2 is a more detailed block diagram of the transmitter of FIG. 1.

Referring now to FIG. 2, there is provided a bock diagram of the transmitter 102 shown in FIG. 1. The transmitter 102 is comprised of a data source 202. The transmitter 102 is also comprised of a source encoder 204, a symbol formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a real uniform statistics to quadrature Gaussian statistics mapper device (RUQG) 220, and a sample rate matching filter (SRMF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For example, the data can be used to represent text, telemetry, audio, or video data. The source encoder 204 is further configured to supply bits of data to the symbol formatter 206 at a particular data transfer rate.

The symbol formatter 206 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then the symbol formatter 204 can also be configured to differentially encode formed PSK symbols. Differential encoding is well known to persons skilled in the art and therefore will not be described in detail herein. The symbol formatter 206 can be further configured to communicate non-differentially encoded PSK symbols and/or differentially encoded PSK symbols to the multiplexer 214. Still, the invention is not limited in this regard.

According to an embodiment of the invention, the symbol formatter 206 is functionally similar to a serial in/parallel out shift register where the number of parallel bits out is equal to log base two ($\log_2$) of the order of the channel encoder 216. In this regard, the symbol formatter 206 is selected for use with a quadrature phase shift keying (QPSK) modulator. As such, the symbol formatter 206 is configured to perform a QPSK formatting function for grouping two (2) bits of data together to form a QPSK symbol (i.e., a single two bit parallel word). Thereafter, the symbol formatter 206 communicates the encoded QPSK symbol to the multiplexer 214. Still, the invention is not limited in this regard.

According to additional embodiments of the invention, the symbol formatter 206 is selected for use with other digital modulation techniques employing controlled amplitude or phase modulation. Such digital modulation techniques include a sixteen quadrature amplitude modulation (16QAM) modulator, a binary phase-shift keying (BPSK) modulator, a sixteen amplitude and phase-shift keying (ASPK) modulator, or a more general signal constellation based on residue number theory. Analog modulation techniques (such as on-off-keying, amplitude shift keying, and frequency shift keying) may also be used. Digital and analog modulation techniques are well known to those having ordinary skill in the art, and therefore will not be described herein. As such, the symbol formatter 206 is configured to map data bits to modulation symbols and then communicate the symbols to the multiplexer 214. Still, the invention is not limited in this regard.

The transmitter 102 also includes an acquisition data generator 208 capable of generating a "known data preamble" that can be used to facilitate initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, the invention is not limited in this regard.

According to another embodiment of the invention, the "known data preamble" may be injected at known intervals to aid in periodic resynchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the data symbols to be routed to the channel encoder 216 after a preamble period has expired. The multiplexer 214 is also configured to communicate the data symbols to the channel encoder 216. In this regard, it should be appreciated that a communication of the data symbols to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" and the data symbols in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons skilled in the art. Thus, such methods will not be described in detail herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK modulator will include an in-phase ("I") data and quadrature phase ("Q") data. The I and Q data will be thereafter communicated to the digital complex multiplier 224.

According to an embodiment of the invention, the transmitter 102 is further comprised of a sample rate matching device (not shown) between the channel encoder 216 and the digital complex multiplier 224. The sample rate matching device (not shown) is provided for resampling the amplitude-and-time-discrete digital signal. As should be appreciated, the sample rate matching device (not shown) performs a sample rate increase on the amplitude-and-time-discrete digital signal so that a sample rate of the amplitude-and-time-discrete digital signal is the same as a digital chaotic sequence communicated to the digital complex multiplier 224. Still, the invention is not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The chaos generator 218 is described in U.S. patent application Ser. No. 11/737,459. The entire disclosure of U.S. patent application Ser. No. 11/737,459 is incorporated herein by reference. However, it should be understood that the invention is not limited to use with such chaos generator 218. Instead, the chaos generator 218 can also be a conventional pseudorandom number generator or an analog-based chaotic sequence generator. Pseudorandom number generators are well known in the art.

The rate at which the digital chaotic sequence is generated is an integer multiple of a data symbol rate. The greater the ratio between the data symbol period and the sample period of the digital chaotic sequence, the higher a spreading gain. The chaos generator 218 communicates the chaotic sequence to a RUQG 220. The RUQG 220 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a notionally complex-valued bivariate Gaussian transformation to a quadrature output having statistical characteristics of a Gaussian distribution. Such conversions are well understood by those skilled in the art, and therefore will not be described in detail herein. However, it should be understood that such techniques may use nonlinear processors, look-up tables, iterative processing (CORDIC functions), or other similar mathematical processes. The RUQG 220 is further configured to communicate transformed chaotic sequences to the SRMF 222.

The statistically transformed output of the digital chaotic sequence has a multi-bit resolution consistent with a resolution of the DAC 232. The RUQG 220 communicates the statistically transformed output of the digital chaotic sequence to the SRMF 222. For example, the RUQG 220 communicates an in-phase ("I") data and quadrature phase ("Q") data to the SRMF 222 when the channel encoder 216 is configured to yield a complex output representation. Still, the invention is not limited in this regard.

If a chaos sample rate of the transformed chaotic sequence is different than a sample rate of the amplitude-and-time-discrete digital signal, then the two rates must be matched. The chaotic sequence can therefore be resampled in the SRMF 222. For example, SRMF 222 can be comprised of a real sample rate matching filter to resample each of the in-phase and quadrature-phase processing paths of the chaotic sequence. As should be appreciated, the SRMF 222 performs a sample rate change on the transformed digital chaotic sequence so that a sample rate of the transformed digital chaotic sequence is the same as an amplitude-and-time-discrete digital signal communicated to the digital complex multiplier 224 from the channel encoder 216. The SRMF 222 is also configured to communicate a resampled, transformed digital chaotic sequence to the digital complex multiplier 224.

According to an embodiment of the invention, the RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where $\{u_1, u_2\}$ are uniformly distributed independent input random variables and $\{G_1, G_2\}$ are Gaussian distributed output random variables. In such a scenario, the SRMF 222 is comprised of one sample rate matching filter to resample an in-phase ("I") data sequence and a second sample rate matching filter to resample a quadrature-phase ("Q") data sequence. The SRMF 222 is configured to communicate a resampled, transformed digital chaotic sequence to the digital complex multiplier 224. More particularly, the SRMF 222 communicates an in-phase ("I") data and quadrature phase ("Q") data to the digital complex multiplier 224. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. In such a scenario, the sample rate matching device (not shown) between the channel encoder 216 and the digital complex multiplier 224 is not required. Still, the invention is not limited in this regard.

The digital complex multiplier 224 performs a complex multiplication on the digital chaotic sequence output from the SRMF 222 and the amplitude-and-time-discrete digital signal output from the channel encoder 216. The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 224 is also configured to communicate digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those skilled in the art and shall not be discussed in detail here.

The interpolator 226 accepts an input from the complex multiplier 224. In a preferred embodiment the modulated symbols are in quadrature form and the interpolator is implemented as two real interpolators. Still, the invention is not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 2, the IF translator and specifically the real part of the complex multiplier 228 are configured to communicate a sampled digital chaotic output signal (i.e., a digital chaotic output signal having an increased sampling rate and non-zero center frequency) to the DAC 232. The DAC 232 is configured to convert a sampled digital chaotic output signal to an analog signal. The DAC 232 is also configured to communicate an analog signal to the anti-image filter 234.

In some applications, it can be desirable to change a sampling rate at the output of the digital complex multiplier 224 only, for example when using an interpolating DAC. An IF translator consisting of an interpolator 226 only can be provided for this purpose.

According to an embodiment of the invention, the digital complex multiplier 224 multiplies I and Q data of an amplitude-and-time-discrete digital signal by I and Q data of digital chaotic sequence to obtain a digital chaotic output signal. The digital chaotic output signal is a quadrature, zero IF signal. The digital complex multiplier 224 communicates the quadrature, zero IF signal to the IF translator. The IF translator is an interpolation filter 226 only. The interpolation filter 226 is comprised of dual real interpolators which change the sample rate of the quadrature, zero IF signal to a predetermined rate, such as seventy (70) mega sample per second. The interpolation filter 226 communicates the sampled, quadrature, zero IF signal to the DAC 232. The DAC 232 is an interpolating DAC that increases the effective sample rate. According to an embodiment of the invention, the DAC 232 interpolates the received zero IF signal to a two hundred eighty (280) mega sample per second sample rate. The DAC 232 also up converts a real output component by a factor of the interpolated sample frequency (two hundred eighty (280) mega sample per second) divided four (4) before conversion to an analog signal. The output of the DAC 232 is thus a real signal centered at a seventy (70) mega hertz intermediate frequency with a first image centered at two hundred ten (210) mega hertz. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIG. 3A).

It should be understood that the digital generation of the digital chaotic sequence at the transmitter 102 and receiver 104 is kept closely coordinated under the control of a precision real time reference 212 clock. The higher the precision of the clock 212, the closer the synchronization of the chaos generator 218 of the transmitter 102 and the chaos generator (described below in relation to FIG. 3A) of the receiver 104 shall be excluding the effects of processing delay differences and channel propagation times. The use of a precision real time reference allows the states of the chaos generators to be easily controlled with accuracy.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 206 through 232 while being locked to a lower frequency reference clock. The lower frequency reference clock supplies a common reference and a common real time of day reference to prevent a large drift between the states of the chaos generator 218 and the chaos generator (described below in relation to FIG. 3A) of the receiver 104 over an extended time interval.

A person skilled in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102. As yet another example, the spreading sequence or method may be chosen to depend on a pseudorandom number generator without chaotic properties.

Figure 3:
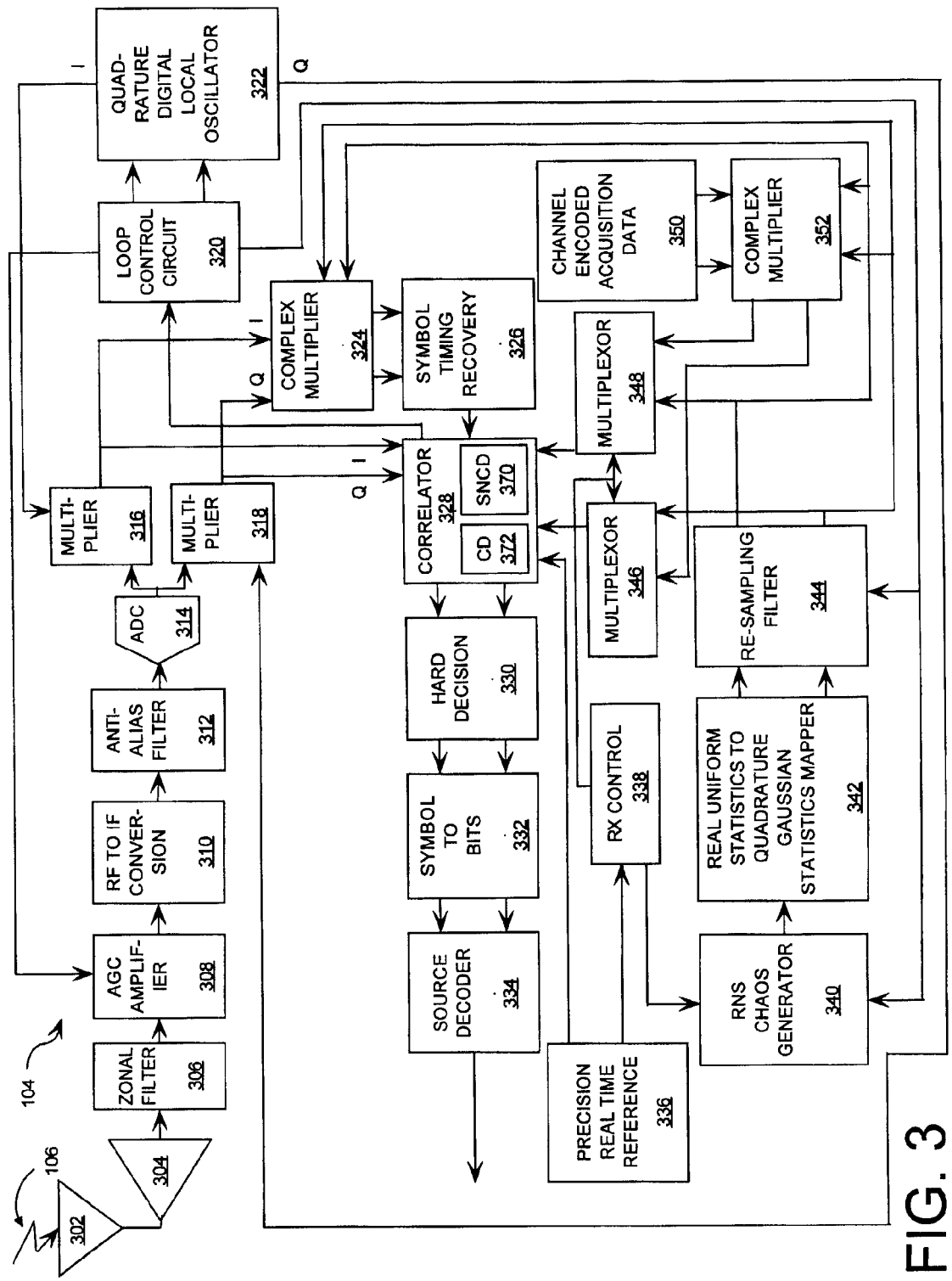
FIG. 3 is a more detailed block diagram of the receiver of FIG. 1.

Referring now to FIG. 3, there is provided a block diagram of the receiver 104 of FIG. 1. It should be noted that in conventional analog based coherent communications systems analog chaos circuits are synchronized by periodically exchanging state information. The exchange of state information requires a substantial amount of additional bandwidth. This is what makes analog based coherent communications impracticable. The receiver 104 of FIG. 3 is designed to eliminate the drawbacks of conventional analog based coherent communications systems. In this regard it should be appreciated that the receiver 104 is comprised of a digital chaos generator. The receiver 104 includes a tracking loop for synchronizing its digital chaos generator and the digital chaos generator 218 of the transmitter 102. Most significantly, the receiver is configured to synchronize two (2) sequences of discrete time chaotic samples without using a constant or periodic transfer of state update information. A first sequence of discrete time chaotic samples is generated at the transmitter 102. A second sequence of discrete time chaotic samples is generated at the receiver 104.

Referring again to FIG. 3, the receiver 104 is comprised of an antenna element 302, a low noise amplifier (LNA) 304, a zonal filter 306, an AGC amplifier 308, a radio frequency (RF) to intermediate frequency (IF) conversion device 310, an anti-alias filter 312, and an analog-to-digital (A/D) converter 314. The receiver 104 is also comprised of real multipliers 316, 318, a loop control circuit 320, a quadrature digital local oscillator 322, a correlator 328, a multiplexers 346, 348, a channel encoded acquisition data generator (CEADG) 350, digital complex multipliers 324, 352, and a symbol timing recovery circuit 326. The receiver 104 is further comprised of a receiver controller 338, a precision real time reference clock 336, a hard decision device 330, a symbol to bits (S/B) converter 332, and a source decoder 334. The receiver 104 is comprised of a chaos generator 340, a real uniform statistic to quadrature Gaussian statistic mapper (RUQG) 342, and a re-sampling filter 344. Each of the above listed components and circuits 302-318, 322-326, 330-338, 342-352 are well known to persons skilled in the art. Thus, these components and circuits will not be described in detail herein. However, a brief discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 3, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to persons skilled in the art, and therefore will not be described in detail herein. It should be appreciated that the zonal filter 306 is configured to communicate a filtered, analog input signal to the automatic gain control (AGC) amplifier 308. An automatic gain control (AGC) amplifier 308 is a controllable gain amplifier used to keep the magnitude of the received signal within normal bounds for the rest of the signal processing chain. Automatic gain control (AGC) amplifiers are well known to persons skilled in the art, and therefore will not be described in detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a preferred IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to a second IF translator which is comprised of the real multipliers 316, 318, and the programmable quadrature digital local oscillator 332.

The multiplier 316 is configured to receive a digital word as input from the A/D converter 314 and a digital word from the in-phase component of the quadrature digital local oscillator 322. The multiplier 316 multiplies the output of the A/D converter 314 by the in-phase component of the quadrature digital local oscillator 322. The multiplier 316 is also configured to communicate a digital output word. The multiplier 318 is configured to receive a digital word as input from the A/D converter 314 and a digital word from the quadrature-phase component of the quadrature digital local oscillator 322. The multiplier 318 multiplies the output of the A/D converter 314 by the quadrature-phase component of the quadrature digital local oscillator 322. The multiplier 318 is also configured to communicate a digital output word.

The quadrature digital local oscillator 322 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 320. Quadrature digital local oscillators are known to those skilled in the art, and therefore will not be described in detail herein.

The IF translator is configured to mix the digital input signal to a preferred IF for processing at the correlator 328 and the digital complex multiplier 324. The IF translator is also configured to communicate a digital input signal to the correlator 328 and the digital complex multiplier 324. As will be appreciated by those skilled in the art, the output of the IF translator can include an in-phase ("I") data and quadrature phase ("Q") data. As such, the IF translator can communicate I and Q data to the correlator 328 and the digital complex multiplier 324.

The digital complex multiplier 324 is configured to perform a complex multiplication in the digital domain. In the complex-valued digital multiplier 324, the digital input signal from the IF translator is multiplied by a digital representation of a chaotic sequence. The chaotic sequence is generated in the chaos generator 340. The chaos generator 340 is described in U.S. patent application Ser. No. 11/737,459. The entire disclosure of U.S. patent application Ser. No. 11/737,459 is incorporated herein by reference. However, it should be appreciated that the inventive arrangements can also be implemented by using a conventional pseudorandom number generator in place of the chaos generator 340.

The chaos generator 340 communicates the chaotic sequence to an RUQG 342. In this regard, it should be appreciated that the chaos generator 340 is coupled to the receiver controller 338. The receiver controller 338 is configured to control the chaos generator 340 so that the chaos generator 340 generates a chaotic sequence with the correct initial state when the receiver 104 is in an acquisition mode and a tracking mode.

The RUQG 342 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. The RUQG 342 is further configured to communicate transformed chaotic sequences to the re-sampling filter 344.

According to the embodiment of the invention, the RUQG 342 statistically transforms a digital chaotic sequence into a quadrature Gaussian form of the digital chaotic sequence. The RUQG 342 communicates the quadrature Gaussian form of the digital chaotic sequence to the re-sampling filter 344. More particularly, the RUQG 342 communicates an in-phase ("I") data and quadrature phase ("Q") data to the re-sampling filter 344. Still, the invention is not limited in this regard.

The re-sampling filter 344 is also configured to forward a transformed chaotic sequence to the digital complex multiplier 324. The re-sampling filter 344 is configured as a sample rate change filter for making the chaos sample rate compatible with the received signal sample rate when the receiver 104 is in acquisition mode. The re-sampling filter 344 is also configured to compensate for transmit and receive clock offsets with less than a certain level of distortion when the receiver is in a steady state demodulation mode. In this regard, it should be appreciated that the re-sampling filter 344 is configured to convert a sampling rate of in-phase ("I") and quadrature-phase ("Q") data sequences from a first sampling rate to a second sampling rate without changing the spectrum of the data contained in therein. The re-sampling filter 344 is further configured to communicate in-phase ("I") and quadrature-phase ("Q") data sequences to the digital complex multipliers 324, 352, and the multiplexers 346, 348.

It should be noted that if a sampled form of a chaotic sequence is thought of as discrete samples of a continuous band limited chaos then the re-sampling filter 344 is effectively tracking the discrete time samples, computing a continuous representation of the chaotic sequence, and resampling the chaotic sequence at the discrete time points required to match the discrete time points sampled by the A/D converter 314. In effect, input values and output values of the re-sampling filter 344 are not exactly the same because the values are samples of the same waveform taken at slightly offset times. However, the values are samples of the same waveform so the values have the same power spectral density.

Referring again to FIG. 3, the CEADG 350 is configured to generate a modulated acquisition sequence. The CEADG 350 is also configured to communicate a modulated acquisition sequence to the digital complex multiplier 352. The digital complex multiplier 352 is configured to perform a complex multiplication in the digital domain. This complex multiplication includes multiplying a modulated acquisition sequence from the CEADG 350 by a digital representation of a chaotic sequence to yield a reference for a digital input signal. The digital complex multiplier 352 is also configured to communicate the reference signal to the multiplexers 346, 348. The multiplexer 346 is configured to route the quadrature-phase part of a reference signal to the correlator 328. The multiplexer 348 is configured to route the in-phase part of a reference signal to the correlator 328. In this regard, it should be appreciated that the multiplexers 346, 348 are coupled to the receiver controller 338. The receiver controller 338 is configured to control the multiplexers 346, 348 in tandem so that the multiplexers 346, 348 route the reference signal to the correlator 328 while the receiver 104 is in an acquisition mode (described below).

The correlator 328 is comprised of a selective noise cancellation device (SNCD) 370 and a correlation device 372. The SNCD 370 is provided to make a correlation process performed by the correlation device 372 more robust by improving the SNR of a received chaotic signal. In this regard, it should be understood that the SNCD 370 implements an adaptive correlation method involving selectively skipping sequence samples including signal and noise based on an internally generated chaotic sequence. The method will be described in detail below (in relation to FIG. 4).

The correlation device 372 is configured to correlate the internally generated chaotic sequence with a digital input signal. In this regard, it should be understood that, the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when the correlation device 372 is in a steady state demodulation mode the output of the correlation device 372 is PSK symbol soft decisions. In particular, soft-decisions are values that represent the probability that a particular bit in a sequence is either a one (1) or a zero (0). For example, a soft-decision for a particular bit can indicate that a probability of a bit being a one (1) is p(1)=0.3. Conversely, the same bit can have a probability of being a zero (0) which is p(0)=0.7.

The correlation device 372 is also configured to communicate PSK soft decisions to the hard decision device 330 for final symbol decision making. The hard decision device 330 is configured to communicate symbol decisions to the S/B converter 332. The S/B converter 332 is configured to convert symbols to a binary form. The S/B converter 332 is configured to communicate a binary data sequence to the source decoder 334. The source decoder 334 is configured to decode FEC applied at the transmitter and to pass the decoded bit stream to one or more external devices (not shown) utilizing the decoded data.

The correlation device 372 is also configured to acquire initial timing information associated with a chaotic sequence, initial timing associated with a data sequence and to track phase and frequency offset information between the chaotic sequence and a digital input signal. The correlation device 372 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to persons skilled in the art, and therefore will not be described in detail herein. However, it should be appreciated that any such method can be used without limitation.

Referring again to FIG. 3, the correlation device 372 is configured to communicate the magnitude and phase information as a function of time to the loop control circuit 320. The loop control circuit 320 uses the magnitude and phase information to calculate the deviation of the input signal magnitude from a nominal range, and phase and frequency offset information to synchronize a chaotic sequence with a digital input signal. The loop control circuit 320 is also configured to communicate the phase and frequency offset information to the quadrature digital local oscillator 322 portion of the IF translator and gain deviation compensation information to the automatic gain control (AGC) amplifier 308. The loop control circuit 320 is further configured to communicate a retiming control signal to the re-sampling filter SRMD 344 and the chaos generator 340.

It should be understood that the digital generation of the digital chaotic sequence at the transmitter 102 and receiver 104 is kept closely coordinated under the control of a precision real time reference clock 336. The higher the precision of the clock 336, the closer the synchronization of the chaos generator 218 of the transmitter 102 and the chaos generator 340 of the receiver 104 shall be excluding the effects of processing delay differences and channel propagation times. It is the use of digital chaos generators 218, 340 that allow the states of the chaos generators to be easily controlled with precision, thus allowing coherent communication.

Referring again to FIG. 3, the precision real time reference clock 336 is a stable local oscillator locked to a precision real time reference, such as a GPS clock receiver or a chip scale atomic clock (CSAC). The precision real time reference clock 336 is configured to supply a high frequency clock to the clocked logic circuits 314, ..., 352 while being locked to a lower frequency reference clock. The lower frequency reference clock supplies a common reference and a common real time of day reference to prevent a large drift between the states of the chaos generator 218 and the chaos generator 340 of the receiver 104 over an extended time interval.

A person skilled in the art will appreciate that the receiver 104 is an exemplary architecture of a communications system receiver. However, the invention is not limited in this regard and any other receiver architecture can be used without limitation.

Methods for Improving a SNR of a Chaotic Spread Spectrum Signal

The invention concerns a method for improving a signal-to-noise ratio (SNR) of spread spectrum signals generated by a communications system, such as the communications system 100 described above in relation to FIG. 1. As described above, a chaotic spread spectrum signal is generated by combining samples of a data signal with respective random numbers of a synchronized internally generated replica of the chaotic spreading sequence. A graph illustrating the magnitudes of the random numbers 402, 404, 406, 408 used in a spreading (or combination) process is provided in FIG. 4. As a result of this spreading (or combination) process, a chaotic spread spectrum signal is generated. A graph illustrating samples of a chaotic spread spectrum signal is provided in FIG. 5. The term "sample" as used herein refers to a periodically digitized amplitude and/or phase value derived from a deterministic mathematical process. As shown in FIG. 5, each of the samples 502, 506 has an instantaneous signal amplitude that is lower than the instantaneous signal amplitude of other samples 504, 508 of the chaotic spread spectrum signal. One can appreciate that the SNR of the chaotic spread spectrum signal can be improved by selectively eliminating (or discarding) the samples 502, 506 with the relatively low instantaneous signal amplitudes since the statistical expectation of instantaneous power in an uncorrelated noise sequence is a constant.

Figure 6:
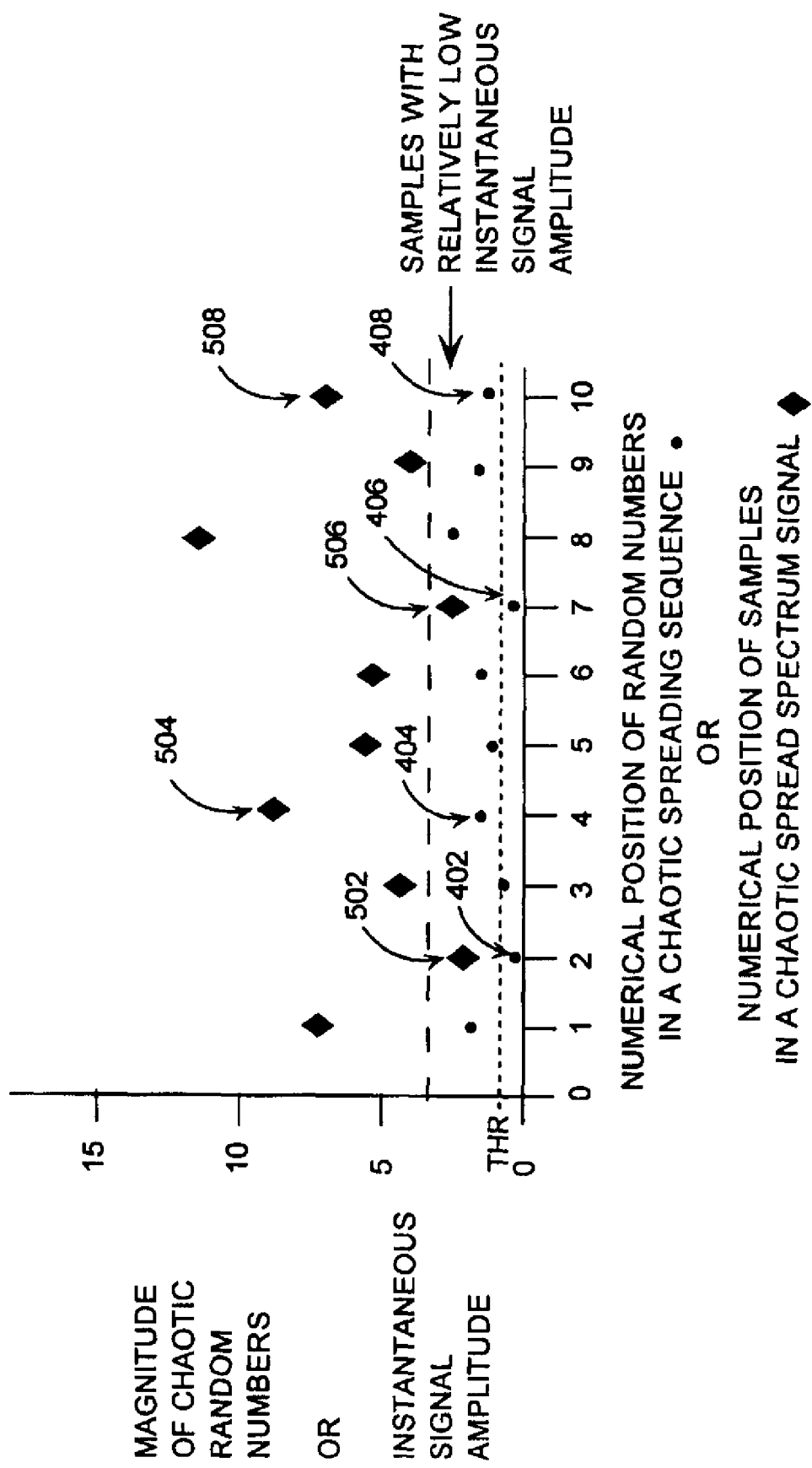
FIG. 6 is an overlap graph illustrating the relationship between samples having a relatively low SNR and the magnitudes of random numbers used in a spreading process performed by the transmitter of FIG. 1.

The values of the instantaneous signal amplitudes for the samples 502, 504, 506, 508 of the chaotic spread spectrum signal can be determined using the magnitude values of the random numbers 402, 404, 406, 408 of the chaotic spreading sequence. A graph illustrating the relationship between the instantaneous signal amplitudes of the samples 502, 504, 506, 508 and the magnitudes of the random numbers 402, 404, 406, 408 is provided in FIG. 6. As shown in FIG. 6, there is a statistical expectation that a sample 502, 504, 506, 508 will have a relatively low instantaneous signal amplitude when the respective random number 402, 404, 406, 408 of the synchronized internally generated chaotic spreading sequence has a value falling below a pre-defined threshold value (THR). This threshold is a mathematically derived quantity that balances the loss in signal power with the processing gain obtained from a large spreading ratio. As such, the method generally involves (a) selectively eliminating (or discarding) random numbers 402, 406 of a chaotic random number sequence having values falling below a pre-defined threshold and (b) selectively eliminating (or discarding) the respective samples 502, 506 of the chaotic spread spectrum signal. The method will be described below in relation to FIGS. 7-9.

Prior to describing the method in greater detail, it should be understood that the threshold value is mathematically derived based on relative signal and noise power level values of the chaotic spread spectrum signal. For example, the threshold value can be based on a minimum magnitude of each random number necessary to produce samples having a predetermined signal-to-noise ratio. In this regard, let us consider a chaotic spread spectrum signal with a flat spread power level that is 10 dB lower than the ambient noise floor at a receiver. In order to obtain a 4 dB effective increase in SNR, all samples of an internally generated and synchronized coherent replica of the chaotic signal (a standard Normal statistical distribution is assumed) are eliminated if below a threshold of one (1.0) standard deviation. The effective decrease in signal power (assuming perfect synchronization) in the de-spreader decreases by twenty percent (20%). The effective decrease in noise power is sixty-eight (68%). The phrase "standard Normal distribution" as used herein refers to a Normal or Gaussian distribution having zero mean and unit variance. Notably, the preceding SNR estimates are at the input to the despreader. The effective increase in the output SNR based on the resulting conditional distributions is closer to 1 dB.

Figure 7:
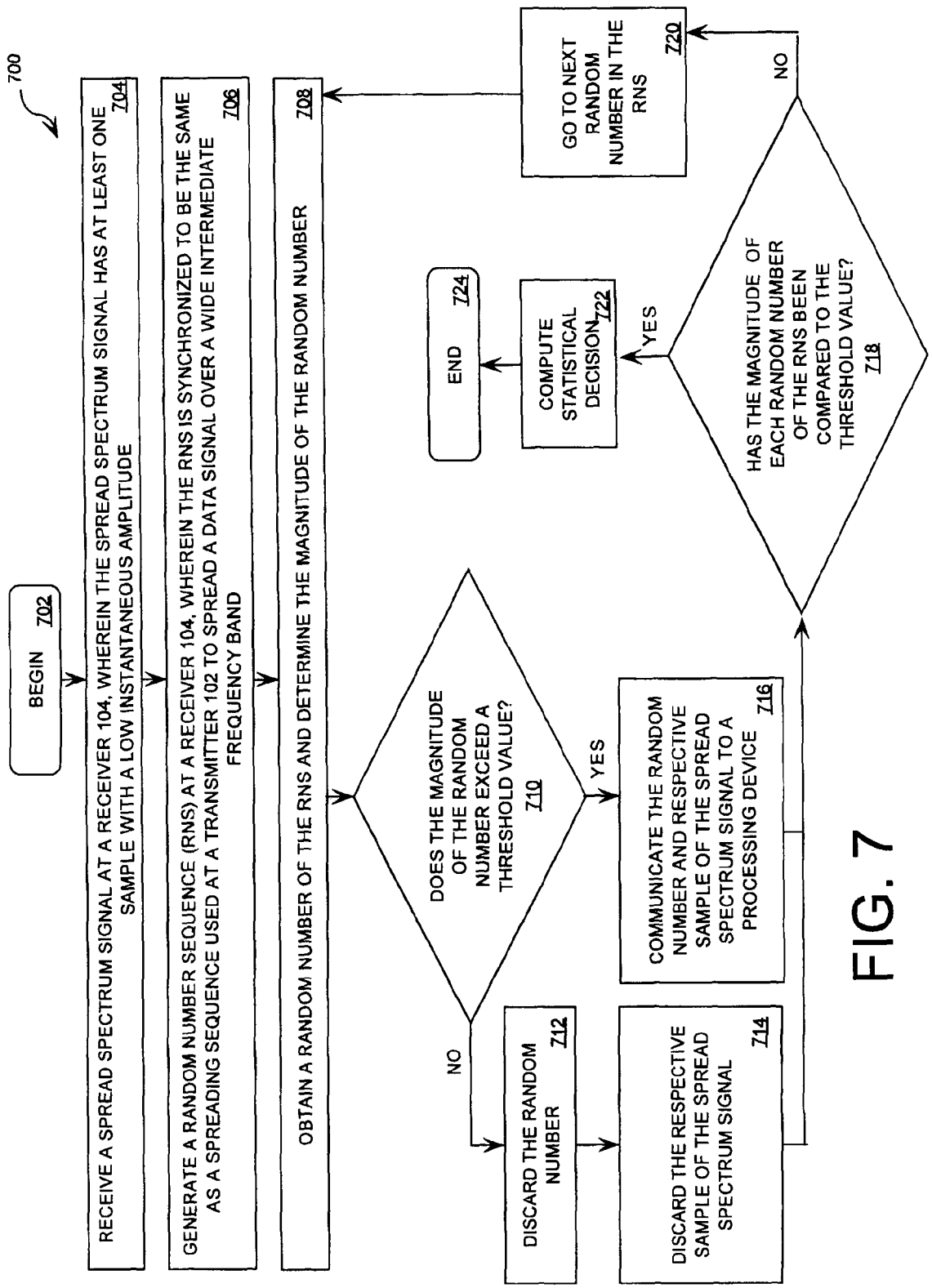
FIG. 7 is a flow diagram of a method for improving a signal-to-noise ratio (SNR) of spread spectrum signals.

Referring now to FIG. 7, there is provided a flow diagram of a method 700 for improving a signal-to-noise ratio (SNR) of a spread spectrum signal (SSS), such as a chaotic spread spectrum signal. As shown in FIG. 7, the method 700 begins at step 702 and continues with step 704. In step 704, a spread spectrum signal is received at a receiver 104. The spread spectrum signal has at least one sample with a low instantaneous signal amplitude. Thereafter, the method continues with step 706. In step 706, a random number sequence is generated at the receiver 104. The random number sequence can be a chaotic or a pseudo chaotic random number sequence. The random number sequence is the same as the spreading sequence used at the transmitter 102 to spread a data signal over a wide intermediate frequency band. After generating the random number sequence, step 708 is performed where a random number of the random number sequence is obtained. Step 708 also involves determining the magnitude of the random number.

Once the magnitude of the random number is determined, the method 700 continues with a decision step 710. If the magnitude of the random number does not exceed a threshold value [710:NO], then the method 700 continues to step 712. In step 712, the random number is discarded. In this regard, it should be appreciated that the random number has the same value as a respective random number of a spreading sequence used in a spreading process. If the respective random number used in a spreading process had a value falling below the threshold value, then there is a relatively high likelihood that the resulting sample has a low instantaneous signal amplitude. As such, it is also desirable to discard the respective sample of the received spread spectrum signal. Accordingly, the method 700 includes a step 714 where the respective sample of the received spread spectrum signal is discarded. It should be noted that by discarding the respective sample the SNR of the received spread spectrum signal is improved. It should also be noted that the phrase "discarding a sample" refers to the consideration of the element in a statistical decision process and not necessarily a physical discarding. After step 714, the method 700 continues with a decision step 718.

If the magnitude of the random number does exceed a threshold value [710:YES], then the method 700 continues to step 716. In step 716, the random number and respective sample of the received spread spectrum signal are communicated to a processing device, such as a correlation device 372 or a de-spreading device (not shown). After completing step 716, the method 700 continues to a decision step 718.

If the magnitude of the random number exceeds the threshold value [718:YES], then the method 700 continues to step 722. In step 722, a statistical decision is computed. Thereafter, step 724 is performed where the method 700 ends. Alternatively, if the magnitude of each random number of the random number sequence has not been compared to the threshold value [718:NO], then the method 700 continues to step 720. In step 720, a next random number of the random number sequence is selected. Thereafter, the method 700 returns to step 708.

It should be noted that the method 700 for improving an SNR of a spread spectrum signal may be used in both a correlator of a receiver 104 for signal acquisition or in a de-spreader of a receiver 104 for synchronized de-spreading of a data signal. A flow diagram of a method 800 for improving an SNR of a spread spectrum signal via implementation in an adaptive correlator design (e.g., correlator 328 with an SNCD 370) is provided in FIG. 8. A flow diagram of a method 900 for improving an SNR of a spread spectrum signal via implementation in a de-spreader (not shown) is provided in FIG. 9.

Figure 8:
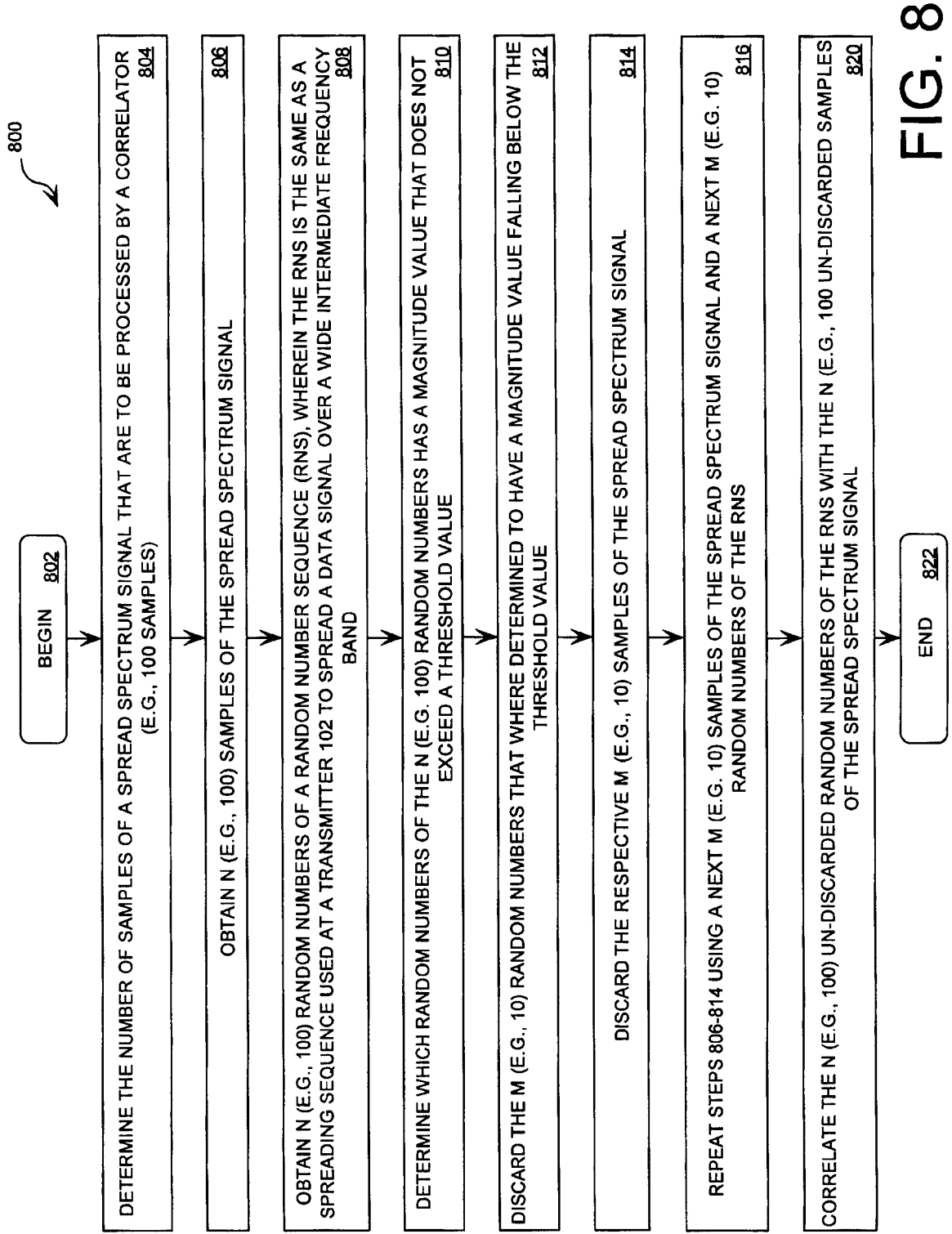
FIG. 8 is a flow diagram of a method for improving an SNR of a spread spectrum signal via implementation in an adaptive correlator design.

Referring now to FIG. 8, the method 800 begins at step 802 and continues with step 804. In step 804, a number N is determined based on a particular correlation application. The number N represents the number of samples of a spread spectrum signal that are to be correlated with random number of a random number sequence. For example, one hundred (100) samples of the spread spectrum signal are to be correlated with one hundred (100) respective random numbers of a random number sequence. As such, the number N is selected to be one hundred (100). After step 804, the method 800 continues with step 806. In step 806, N samples of the spread spectrum signal are obtained. It should be noted that the spread spectrum signal can be a chaotic spread spectrum signal. Subsequently, step 808 is performed where N random numbers of a random number sequence are also obtained. The random number sequence is the same as a spreading sequence used at a transmitter 102 to spread a data signal over a wide intermediate frequency band. As such, the random number sequence can be a chaotic or pseudo-chaotic random number sequence. Thereafter, the method 800 continues with step 810.

In step 810, it is determined which random numbers of the N random numbers has a magnitude value that does not exceed a threshold value. For example, M (e.g., 10) of the N random numbers is determined to have a magnitude value falling below the threshold value. The M (e.g., 10) random numbers determined to have a magnitude value falling below the threshold value are discarded in step 812. Thereafter, the respective M (e.g., 10) samples of the spread spectrum signal are also discarded in step 814.

After step 814, the method 800 continues with step 816. It should also be understood that it was determined in step 804 that N (e.g., 100) samples are to be correlated with N (e.g., 100) random numbers of the random number sequence. As such, the above-described process needs to be repeated until N (e.g., 100) samples of the spread spectrum signal are collected with N (e.g., 100) random numbers of the random number sequence. Accordingly, the method 800 includes step 816 where steps 806-814 are repeated using a next M (e.g., 10) samples of the spread spectrum signal and a next M (e.g., 10) samples of the random number sequence. After N (e.g., 100) samples of the spread spectrum signal are collected with N (e.g., 100) random numbers of the random number sequence, step 820 is performed.

In step 820, the two N-sample sequences are correlated. This correlation is achieved by performing a correlation process. Correlation processes are well known to those having ordinary skill in the art, and therefore will not be described herein. However, it should be understood that any correlation process can be used without limitation. After step 820, step 822 is performed where the method 800 ends.

Figure 9:
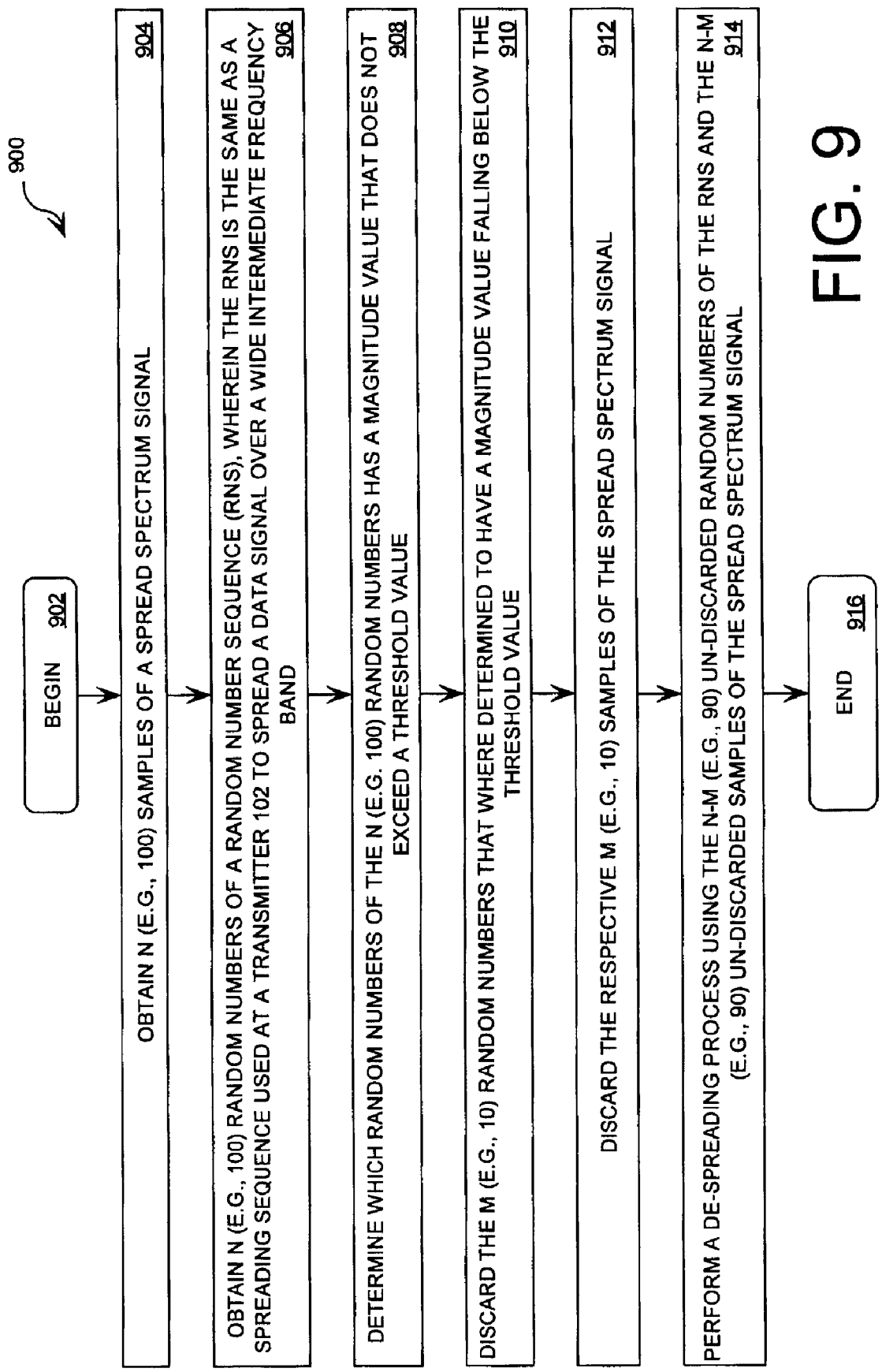
FIG. 9 is a flow diagram of a method for improving an SNR of a spread spectrum signal via implementation in a de-spreader.

Referring now to FIG. 9, there is provided a flow diagram of a method 900 for improving an SNR of a spread spectrum signal via implementation in a de-spreader (not shown). De-spreaders are well known to those skilled in the art, and therefore will not be described in great detail herein. As shown in FIG. 9, the method 900 begins at step 902 and continues with step 904. In step 904, N (e.g. 100) samples of a spread spectrum signal are obtained. The spread spectrum signal can be a chaotic or pseudo-chaotic spread spectrum signal. Thereafter, step 906 is performed where N (e.g. 100) random numbers of a random number sequence are also obtained. The random number sequence can be a chaotic or pseudo-chaotic random number sequence. In step 908, it is determined which random numbers of the N random numbers has a magnitude value that does not exceed a threshold value. For example, M (e.g., 10) of the N random numbers is determined to have a magnitude value falling below the threshold value. The M (e.g., 10) random numbers determined to have a magnitude value falling below the threshold value are discarded in step 910. Thereafter, the respective M (e.g., 10) samples of the spread spectrum signal are also discarded in step 912.

After step 912 is completed, the method 900 continues with step 914. In step 914, a de-spreading process is performed using the N-M (e.g., 90) un-discarded random numbers of the random number sequence and the N-M (e.g., 90) un-discarded samples of the spread spectrum signal. De-spreading processes are well known to those skilled in the art, and therefore will not be described herein. However, it should be understood that any de-spreading process can be used without limitation.

Figure 10:
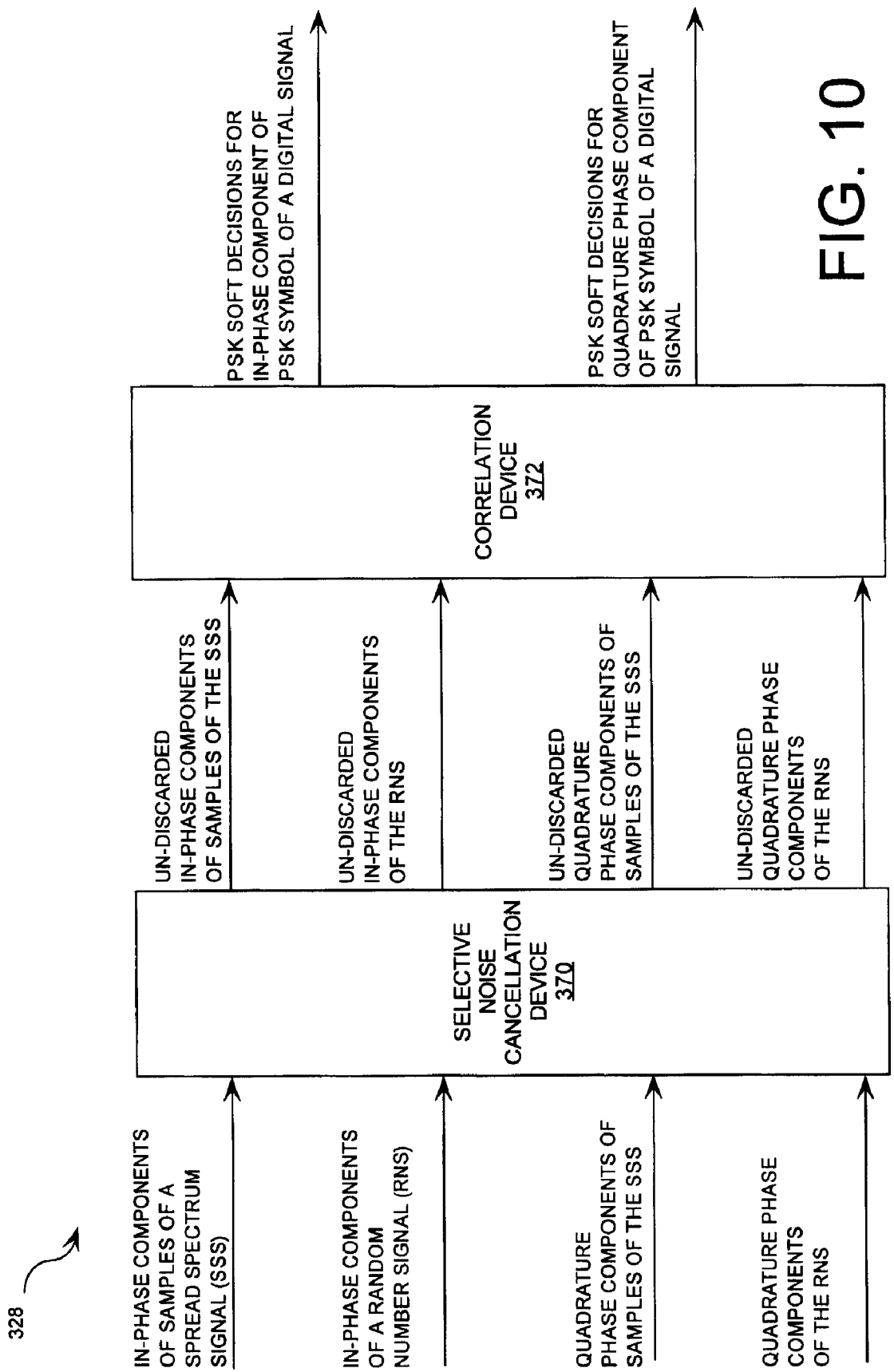
FIG. 10 is a block diagram of a correlator implementing the methods of FIG. 7 and FIG. 8.

Hardware Implementations of the Method for Improving a SNR of a Spread Spectrum Signal Referring now to FIG. 10, there is provided a block diagram of the correlator 328 implementing the methods 700, 800 (described above in relation to FIG. 7 and FIG. 8). As shown in FIG. 10, the correlator 328 is comprised of the selective noise cancellation device (SNCD) 370 and the correlation device (CD) 372. The SNCD 370 is provided to make a correlation process performed by the CD 372 more robust by improving the effective signal-to-noise ratio (SNR) of a spread spectrum signal. The spread spectrum signal can be a chaotic or pseudo-chaotic spread spectrum signal. In this regard, it should be understood that the SNCD 370 implements the method 700 (described above in relation to FIG. 7) involving selectively eliminating (or discarding) samples including signal and noise based on the magnitude of a random number signal generated at the receiver 104 (described above in relation to FIG. 1 and FIG. 3). The random number signal can be a signal including a chaotic or pseudo-chaotic random number sequence.

As shown in FIG. 10, the SNCD 370 is configured to receive in-phase components of samples of a spread spectrum signal, in-phase components of a random number signal, quadrature phase components of samples of the spread spectrum signal, and quadrature phase components of the random number signal. The SNCD 370 is also configured to perform a selective noise cancellation process. The selective noise cancellation process involves determining the magnitude of a random number using the in-phase component of the random number and/or the quadrature phase of the random number sequence. The selective noise cancellation process also involves determining whether the magnitude of the random number exceeds a pre-defined threshold value. If the magnitude of the random number exceeds the pre-defined threshold value, then the SNCD 370 forwards the in-phase component of the random number, the quadrature phase component of the random number, the in-phase component of a respective spread spectrum signal sample, and a quadrature phase component of the respective spread spectrum signal sample to the CD 372. Alternatively, if the magnitude of the random number falls below the pre-defined threshold value, then the SNCD 370 will discard the in-phase component of the random number, the quadrature phase component of the random number, the in-phase component of a respective spread spectrum signal sample, and a quadrature phase component of the respective spread spectrum signal sample. The SNCD 370 is configured to repeat the above-described selective noise cancellation process for each received sample of the spread spectrum signal and each received random number of the random number signal.

The CD 372 is described in detail above in relation to FIG. 3. The description above is sufficient for understanding the CD 372. However, it should be understood that the CD 372 is configured to perform a correlation process. Correlation processes are well known to those skilled in the art, and therefore will not be described herein.

Figure 11:
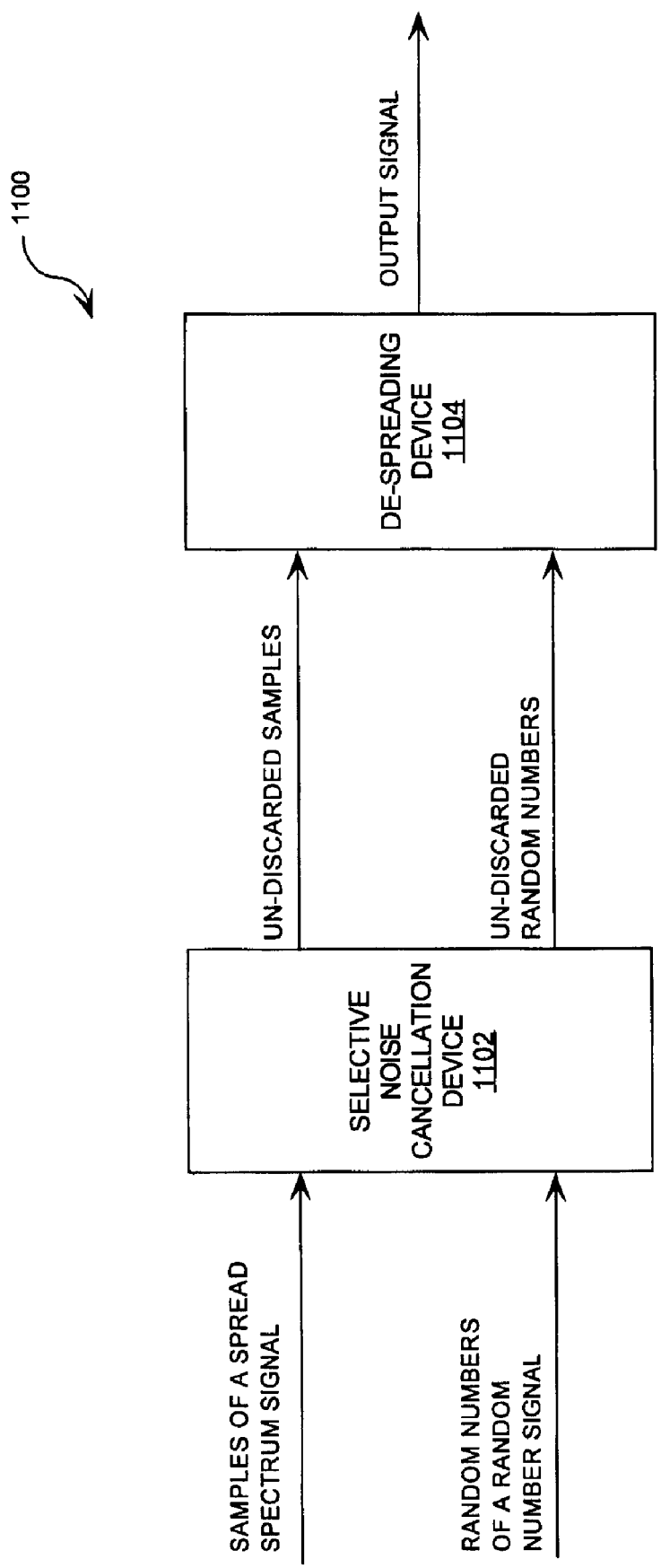
FIG. 11 is a block diagram of a de-spreader implementing the methods of FIG. 7 and FIG. 9.

Referring now to FIG. 11, there is provided a block diagram of a de-spreader 1100 implementing the methods of FIG. 7 and FIG. 9. As shown in FIG. 11, the de-spreader 1100 is comprised of a selective noise cancellation device (SNCD) 1102 and a de-spreading device 1104. The SNCD 1102 is provided to make a de-spreading process performed by the de-spreading device 1104 more robust by improving the effective signal-to-noise ratio (SNR) of a spread spectrum signal. Without loss of generality, the spread spectrum signal can be a chaotic or pseudo-chaotic spread spectrum signal. In this regard, it should be understood that the SNCD 1102 implements the method 700 (described above in relation to FIG. 7) involving selectively eliminating (or discarding) samples including signal and noise based on the magnitude of the random numbers of a coherent random number signal generated at the receiver 104 (described above in relation to FIG. 1 and FIG. 3). The random number signal can be a signal including a chaotic or pseudo-chaotic random number sequence.

As shown in FIG. 11, the SNCD 1102 is configured to receive samples of a spread spectrum signal and random numbers of a random number sequence. The SNCD 1102 is also configured to perform a selective noise cancellation process. The selective noise cancellation process involves determining the magnitude of a received random number. The selective noise cancellation process also involves determining whether the magnitude of the random number exceeds a pre-defined threshold value. If the magnitude of the random number exceeds the pre-defined threshold value, then the SNCD 1102 forwards the random number and the respective sample of the spread spectrum signal to the de-spreading device 1104. Alternatively, if the magnitude of the random number falls below the pre-defined threshold value, then the SNCD 1102 discards the random number the respective sample of the spread spectrum signal. The SNCD 1102 is configured to repeat the above-described selective noise cancellation process for each received sample of the spread spectrum signal and each received random number of the random number signal.

The de-spreading device 1104 is configured to perform a de-spreading process. De-spreading processes are well known to those skilled in the art, and therefore will not be described herein. However, it should be understood that the de-spreading device 1104 is configured to extract data from said chaotic spread spectrum signal using said chaotic random number signal.

In light of the forgoing description of the invention, it should be recognized that the present invention can be realized in hardware, software, or a combination of hardware and software. A method for decoding an encoded sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for improving a signal-to-noise ratio in a received signal, comprising:

receiving, by an electronic circuit, a spread spectrum signal which has been generated by modulating a data signal using a spreading sequence comprised of a series of random numbers, said spreading sequence having a higher rate as compared to said data signal;

determining, by said electronic circuit, whether a magnitude of a number included within a coherent time synchronized copy of said series of random numbers which was used to generate said spread spectrum signal exceeds an adaptable threshold value;

selectively excluding, by said electronic circuit, a respective sample of said received spread spectrum signal from a receiver processing step if it is determined that said number does not exceed said adaptable threshold value; and selectively forwarding, by said electronic circuit, said number and said respective sample to a correlation device or a de-spreading device if said magnitude of said number was determined to exceed said adaptable threshold value.

2. The method according to claim 1, further comprising excluding each number of a random number sequence from said receiver processing step based on said comparing step.

3. The method according to claim 1, further comprising selecting said receiver processing step to include a correlation process.

4. The method according to claim 1, further comprising selecting said adaptable threshold based on a minimum magnitude of each number of said coherent time synchronized copy of said series of random numbers necessary to produce samples having a predetermined signal-to-noise ratio.

5. The method according to claim 1, further comprising selecting said subsequent processing step to include a de-spreading step configured for extracting said data signal from said spread spectrum signal.

6. The method according to claim 1, further comprising calibrating said spread spectrum signal to have a power level below a noise floor of a communications system receiver.

7. The method according to claim 1, further comprising generating said spreading sequence using an analog chaotic circuit or a digital pseudo-chaotic generator.

8. The method according to claim 1, further comprising generating a de-spreading sequence comprising said series of random numbers at a receiving device using a chaos generator or a digital pseudo-chaotic generator.

9. A method for improving a signal-to-noise ratio in a received signal, comprising:
receiving a spread spectrum signal which has been generated by modulating a data signal using a spreading sequence comprised of a series of random numbers, said spreading sequence having a higher rate as compared to said data signal;
comparing a magnitude of each number comprising a coherent time synchronized copy of said series of random numbers which was used to generate said spread spectrum signal to an adaptable threshold value;
selectively excluding samples of said received spread spectrum signal from a receiver processing step based on a result of said comparing step; and
communicating each random number of said series of random numbers and said respective sample of said spread spectrum signal to a correlator if said random number exceeds said adaptable threshold value.

10. The method according to claim 9, further comprising correlating said spread spectrum signal in said correlator with said random number sequence, absent of said samples and said numbers excluded as a result of said comparing step.

11. A non-transitory computer readable storage medium having stored thereon a computer program for improving a signal-to-noise ratio in a received signal, the computer program executable by a computer to cause the computer to perform the steps of:
receiving a spread spectrum signal which has been generated by modulating a data signal using a spreading sequence comprised of a series of random numbers, said spreading sequence having a higher rate as compared to said data signal;
comparing a magnitude of a number included within a coherent time synchronized copy of said series of random numbers which was used to generate said spread spectrum signal to an adaptable threshold value;
selectively excluding a respective sample of said received spread spectrum signal from a receiver processing step if it is determined that said number does not exceed said adaptable threshold value; and
selectively forwarding said number and said respective sample to a correlation device or a de-spreading device if said magnitude of said number was determined to exceed said adaptable threshold value.

12. The non-transitory computer readable storage medium according to claim 11, wherein the computer is further caused to exclude each number of a random number sequence from said receiver processing step based on said comparing step.

13. The non-transitory computer readable storage medium according to claim 11, wherein the computer is further caused to select said receiver processing step to include a correlation process.

14. The non-transitory computer readable storage medium according to claim 11, wherein the computer is further caused to select said receiver processing step to include a de-spreading operation configured for extracting said data signal from said spread spectrum signal.

15. The non-transitory computer readable storage medium according to claim 11, wherein the computer is further caused to generate said spreading sequence using an analog chaotic or a digital pseudo chaotic generator.

16. The non-transitory computer readable storage medium according to claim 11, wherein the computer is further caused to generate a de-spreading sequence comprising said series of random numbers at a receiving device using a chaos generator or a digital pseudo-chaotic generator.

17. A non-transitory computer-readable storage medium having stored thereon a computer program for improving a signal-to-noise ratio in a received signal, the computer program executable by a computer to cause the computer to perform the steps of:
receiving a spread spectrum signal which has been generated by modulating a data signal using a spreading sequence comprised of a series of random numbers, said spreading sequence having a higher rate as compared to said data signal;
comparing a magnitude of each number comprising a coherent time synchronized copy of said series of random numbers which was used to generate said spread spectrum signal to an adaptable threshold value;
selectively excluding samples of said received spread spectrum signal from a receiver processing operation based on a result of said comparing step; and
communicating each random number of said series of random numbers and said respective sample of said spread spectrum signal to a correlator if said random number exceeds said adaptable threshold value.

18. The non-transitory computer readable storage medium according to claim 17, wherein the computer is further caused to correlate said spread spectrum signal in said correlator with said random number sequence, absent of said samples and said numbers excluded as a result of said comparing step.

19. A receiver of a communications system, comprising:
RF hardware configured to receive a spread spectrum signal which has been generated by modulating a data signal using a spreading sequence comprised of a series of random numbers, said spreading sequence having a higher rate as compared to said data signal; and a selective noise cancellation device configured to
(a) compare a magnitude of a number included within a coherent synchronized replica of said series of random numbers which was used to generate said spread spectrum signal to an adaptable pre-defined threshold value,
(b) selectively exclude a respective sample of said received spread spectrum signal from a receiver processing if it is determined that said number does not exceed said adaptable threshold value, and
(c) selectively forward said number and said respective sample to a correlation device or a de-spreading device if said magnitude of said number is determined to exceed said adaptable threshold value.

20. The receiver according to claim 19, wherein said selective noise cancellation device is further configured to exclude each number of a random number sequence from said receiver processing based on said comparison.

21. The receiver according to claim 19, wherein said receiver processing includes a correlation process.

22. The receiver according to claim 19, wherein said adaptable threshold is selected based on a minimum magnitude of each number in the synchronized coherent replica of a spreading sequence necessary to produce samples having a predetermined signal-to-noise ratio.

23. A receiver of a communications system, comprising:
RF hardware configured to receive a spread spectrum signal which has been generated by modulating a data signal using a spreading sequence comprised of a series of random numbers, said spreading sequence having a higher rate as compared to said data signal; and
a selective noise cancellation device configured to (a) compare a magnitude of each number comprising a coherent synchronized replica of said series of random numbers which was used to generate said spread spectrum signal to an adaptable pre-defined threshold value, (b) selectively exclude samples of said received spread spectrum signal from a receiver processing based on a result of said comparison, and (c) communicate each random number of said series of random numbers and said respective sample of said spread spectrum signal to a correlator if said random number exceeds said adaptable threshold value.

24. The receiver according to claim 23, wherein said correlator is configured to correlate said spread spectrum signal with said random number sequence, absent of said samples and said numbers excluded as a result of said comparison.

* * * * *